G. CAST.
SCRAPER FOR FURROW OPENERS.
APPLICATION FILED MAR. 27, 1914.
1,129,848.
Patented Mar. 2, 1915.
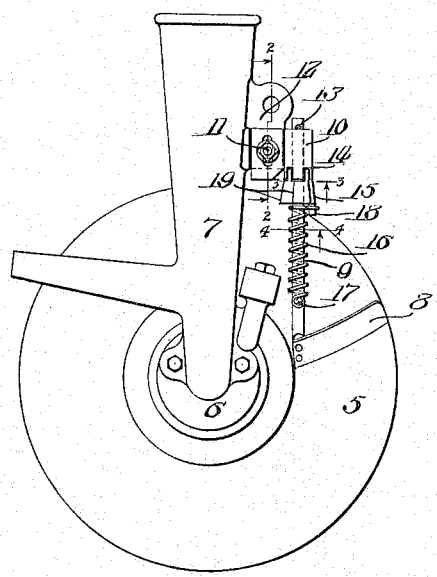
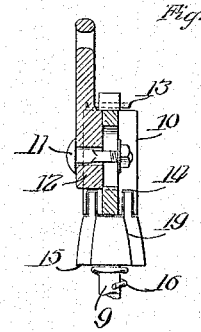
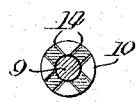
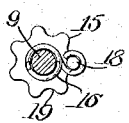
Witnesses:
Inventor:
George Cast
By A. O. Behel
Atty

UNITED STATES PATENT OFFICE.

GEORGE CAST, OF MARION, INDIANA, ASSIGNOR TO EMERSON-BRANTINGHAM COMPANY, OF ROCKFORD, ILLINOIS, A CORPORATION OF ILLINOIS.

SCRAPER FOR FURROW-OPENERS.

1,129,848.  Specification of Letters Patent.  Patented Mar. 2, 1915.

Application filed March 27, 1914. Serial No. 827,689.

*To all whom it may concern:*

Be it known that I, GEORGE CAST, a citizen of the United States, residing at Marion, in the county of Grant and State of Indiana, have invented certain new and useful Improvements in Scrapers for Furrow-Openers, of which the following is a specification.

This invention relates to improvements in furrow openers of the single disk type such as are used in seeding machines, and more particularly to the association of a scraper with the disk.

In the construction of disk furrow openers of the above character it is a practice to provide a scraper held yieldingly in certain relation with the concave side of the concavo-convex disk for the purpose of maintaining said side clean of any dirt or trash; and it is often desirable to change the degree of force for holding the scraper operative with the disk, and to do so requires more or less dismounting of the structure, the use of auxiliary tools and contingent inconveniences.

The object of my invention is to provide a means for adjusting the tension of a spring for holding a scraper in operative relation with a disk furrow opener; and further, such a means that adjustment can be made without disassembling any parts.

In the accompanying drawings: Figure 1 is a side elevational view of a disk furrow opener embodying my improvements. Fig. 2 is a vertical sectional view therethrough as taken on the line 2—2 of Fig. 1. Figs. 3 and 4 are horizontal sectional views taken on the lines 3—3 and 4—4 respectively, of Fig. 1.

In the drawings I have illustrated only so much of a single disk furrow opener as is necessary to explain my invention, the seed discharge elements not being shown. The concavo-convex disk 5 is journaled rotatably in a bearing 6 attached to the lower end of a seed boot 7, the same being adapted to be attached to a seeder frame and drag-bar in a manner well understood in the art.

A relatively flat scraper 8 with its scraping edge conforming to the convex side of the disk is disposed at an angle laterally to said disk and at an angle to the horizontal and is supported in such manner by a vertically disposed rod 9 attached to the scraper at its inner scraping edge, the upper end of the rod being mounted loosely rotatable in a sleeve 10 which is fastened adjustable vertically by a bolt 11 to a lug 12 of the boot 7. A cotter-pin 13 through the top end of the rod limits the rod from downward movement. The lower edge of the sleeve 10 is serrated, the notches 14 of the serration extending into the sleeve with opposite sides parallel with the sleeve axis; and a collar member 15 mounted rotatable upon rod 9 has its end adjacent the sleeve serrated similarly to that of the sleeve, the serrations being engageable as illustrated in the drawings. A coiled spring 16 mounted on rod 9, has one end attached at 17 to said rod and its other end attached to a lug 18 on the collar 15, the spring exerting a tension axially and torsionally to maintain the scraper yieldingly in contact with the disk. The collar periphery is ribbed as at 19 so that it may be easily moved downward by hand to disengage its notched connection with sleeve 10 and then rotated to increase or decrease the tension of the spring as may be desired. This adjustment of the spring is effected without displacing any of the scraper elements and therefore is of very desirous advantage, since it allows the scraper to be assembled with the disk and then to be adjusted to suit without any inconvenience; also, after the disk has been much in use the tension of the spring depreciates or under certain working conditions a stronger tension may be necessary, and in these cases my improved construction allows the necessary tension to be secured very readily.

I claim as my invention:

1. The combination with a furrow opening disk and a scraper for said disk, of a rod supporting the scraper in operative relation with the disk, a supporting member for the rod, a coiled spring about the rod exerting a tension on the scraper to hold it yieldingly in its operative relation with the disk, a member rotatable about the rod axis and connected to one end of the spring, and means for locking said member with said supporting member.

2. The combination with a furrow opening disk and a scraper for the disk, of a rod supporting the scraper, a disk-associated frame supporting the rod, a spring coiled about the rod and exerting a tension on the scraper to hold it yieldingly in operative relation with the disk, a member rotatable about the rod axis and connected to one end of the spring, and means for locking said member with the said frame with its said spring connecting point at one of a plurality of radially spaced points about said rod axis.

3. The combination with a furrow opening disk and a scraper for said disk, of a rod supporting the scraper, a frame supporting the rod, a member rotatably mounted on the rod, a spring coiled about the rod, connected to said member and exerting a tensional force upon the scraper to hold it in operative relation with the disk, and the said rotatable member and frame having each a serrated face whereby said member may be engaged with said frame at relatively different rotated positions.

4. The combination with a furrow opening disk, a scraper for said disk, a supporting member, a rod rotatably mounted at one end on said supporting member and connected at its opposite end to said scraper whereby upon rotary movement of the rod the scraper will be moved laterally with respect to the disk, an adjustable member rotatably mounted on the rod adjacent said supporting member, the adjoining faces of said adjusting member and supporting member being serrated and engageable and disengageable by axial movement of the adjustable member, and a spring connecting the adjustable member with the rod so as to exert a yielding torsional pressure upon rod to hold the scraper in yielding engagement with the disk.

5. The combination of a furrow opening disk, a scraper therefor having a radially extending scraping edge, a rod connected to the scarper at the inner end portion of its scraping edge and being rotatably movable to swing the scraper about its said inner end portion, a spring coiled about the rod exerting yielding torsional pressure thereon to swing the scraper yieldingly toward the disk, and means connected to the spring and being rotatably adjustable about the rod axis for varying the tension of the spring.

6. The combination with a furrow opening disk, of a scraper therefor, a supporting member, a rod rotatably mounted at one end on said supporting member and connected at its opposite end to the scraper, an adjusting member rotatably mounted on the rod intermediate the scraper and supporting member, a spring connected to said adjusting member and being coiled about the rod exerting a yielding torsional pressure thereon to move the scraper yieldingly toward the disk, and means connecting the supporting and adjusting members for permitting the latter to be rotatably adjusted.

7. The combination with a furrow opening disk, of a scraper therefor, a supporting member, a rod rotatably mounted at one end on said supporting member and connected at its opposite end to the scraper, an adjusting member rotatably mounted on the rod intermediate the scraper and supporting member, the adjoining faces of the supporting and adjustable member being serrated, a spring coiled about the rod connected at one end thereto and at its opposite end to the adjusting member for holding the serrated face of the same in yielding engagement with that of the supporting member and for exerting a yielding torsional pressure on the rod for moving the scraper yieldingly toward the disk.

In testimony whereof I have hereunto set my hand in presence of two subscribing witnesses.

GEORGE CAST.

Witnesses:
S. T. WALLACE,
H. L. CUSHWA.

Copies of this patent may be obtained for five cents each, by addressing the "Commissioner of Patents, Washington, D. C."